Feb. 20, 1934.  F. M. CASE  1,948,333

FISHING REEL

Filed April 4, 1929

INVENTOR.
FRANCIS M. CASE.
BY Ely & Barrow
ATTORNEYS

Patented Feb. 20, 1934

1,948,333

UNITED STATES PATENT OFFICE

1,948,333

FISHING REEL

Francis M. Case, Cleveland Heights, Ohio, assignor to The Enterprise Manufacturing Company, Akron, Ohio, a corporation of Ohio Application April 4, 1929. Serial No. 352,405

4 Claims. (Cl. 242—84.5)

The present invention relates to the construction of fishing reels, and particularly to the provision of anti-back-lash mechanism for such reels.

The object of the invention is to construct a new and improved mechanism for preventing the overrunning of spools of fishing reels. The design and construction of a satisfactory anti-back-lash device for a fishing reel presents many practical difficulties, which it is the purpose of the present invention to overcome. The mechanism should be simple and easy of adjustment. It should be positive enough to prevent overrunning of the spool and yet it should not interfere unduly with the free rotation of the spool. It should not be easily gotten out of order and should be light and effective at all times.

The invention is shown in its preferred form, although it will be appreciated that the principles of the invention may be embodied in changed or modified forms without departing from the essential spirit and scope of the invention as set forth in the claims.

In the drawing in which the preferred form of the invention is shown:

Figure 1:
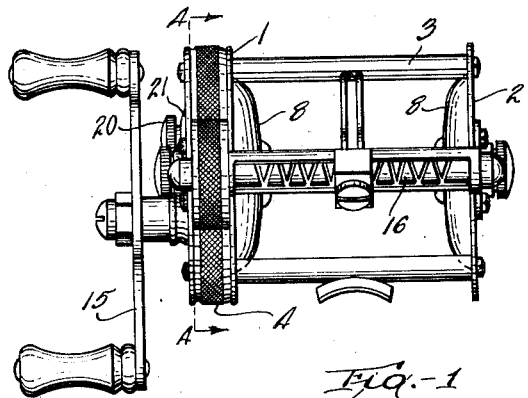
Figure 1 is a side elevation of a complete reel structure showing one form of reel with which my inventions may be employed, although it will be appreciated that the specific form of the reel is not essential.
Figure 2:
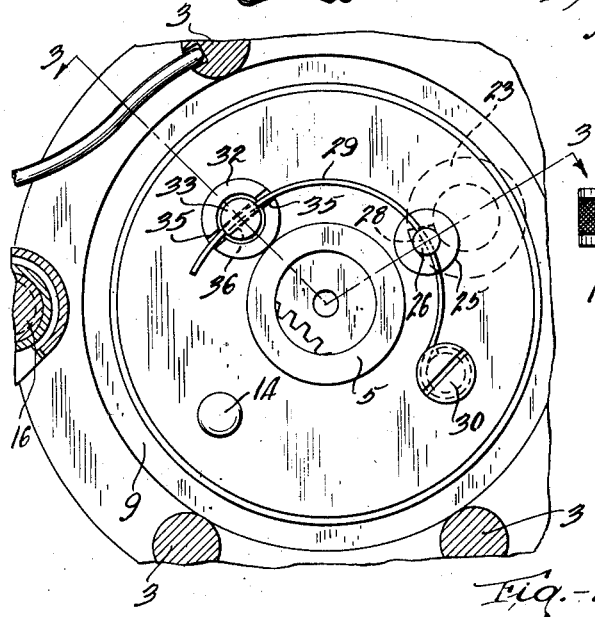
Figure 2 is a view looking at the front end plate directly beneath the spool flange, showing the anti-back-lash device in plan.
Figure 3:
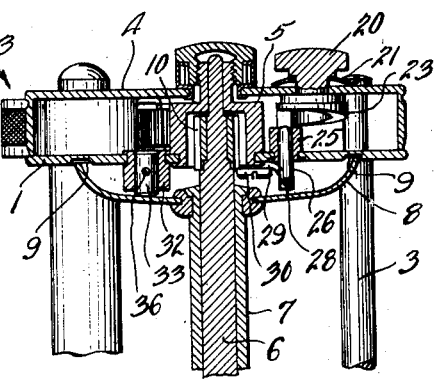
Figure 3 is a section on the broken line 3—3 of Figure 2.
Figure 4:
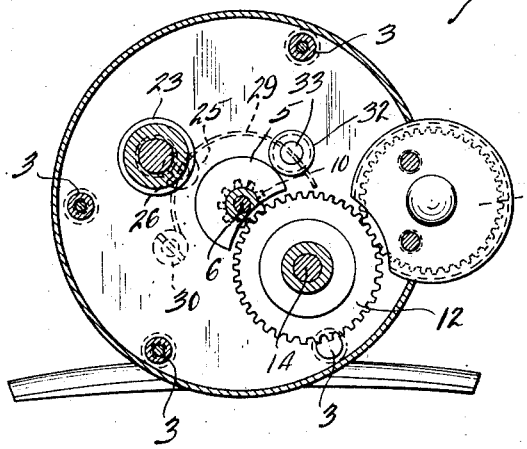
Figure 4 is a section on the line 4—4 of Figure 1.

As indicated above the particular form of fishing reel is not in any way essential to the construction and operation of the invention, but in order to explain the same, certain parts of a well known type of reel have been illustrated.

The reel comprises the front plate 1 and the back plate 2, which are connected together, to constitute the reel structure or frame, by the pillars 3. Over the front plate is located the removable cap plate or cover 4 which supports certain of the driving mechanisms. Located in a bearing in the back plate 2 and in a bearing 5 on the front plate is the shaft 6 of the spool 7, the latter being provided with the spool flanges 8, the outer edges of which are received in grooves 9 in the end plates.

The spool is arranged to be driven by means of a small pinion 10 on the shaft 6, which meshes with the main drive gear 12 on the shaft 14, which latter is driven by the crank handle 15. A level wind mechanism is indicated by the numeral 16 the same being driven from the gear 18, which meshes with the gear 12.

The anti-back-lash device is mounted on the front plate 1, being adjusted by a turn button 20 mounted for rotation in the cover plate 4. Beneath the head of the button is located the convex spring washer 21 which frictionally maintains the button in any position of rotation. The inner portion of the button is provided with a circular flange or rim 23, the surface of which constitutes a cam, formed on a spiral.

Located in the front plate 1 in alignment with the rim is a fixed bearing sleeve 25 in which is slidably mounted the pin 26, the outer end, which bears against the cam, being rounded off to facilitate its movement over the cam. The pin 26 extends beyond the front plate where it is provided with an aperture 28. A light wire spring 29 is attached to the front plate by being wrapped around a clamping screw 30, the spring lying against the surface of the front plate when the anti-back-lash is off. This wire spring, at a short distance from the clamping screw passes through the opening 28 in the pin 26.

Located in the front plate at some distance from the sleeve 25 is a second and larger sleeve 32, in which is loosely and slidably mounted the brake block 33 which is made of a hardened impregnated fibre adapted to serve as a braking medium. The end of the spring is received in the oppositely positioned slots 35 on the sleeve 32 and passes through an aperture 36 in the block 33.

It will be observed that the force of the spring 29 will keep the pin 26 against the surface of the cam or spiral track 23. As the button is turned the pin will be forced outwardly carrying the spring along with it and the movement of the spring will elevate the brake block 33 so that it bears with more or less force against the spool flange, depending upon the degree of rotation of the cam button. The spring permits a certain degree of movement of the brake block so that the brane block may automatically adjust itself to any unevenness in the spool flange or to any irregularity in the rotation of the spool. The arrangement of the brake block on the free end of the wire, with the adjusting pin located between the point of anchorage and the brake block, gives a very easy flexibility of the brake block, and permits a fine and accurate degree of adjustment which is especially suitable for attachment to fishing reels.

The construction shown is very efficient and operates to secure the degree of braking effect necessary to secure the desired anti-back-lash features. The invention may be varied in detail without sacrificing the advantages thereof or departing from the essential principles of the invention.

What is claimed is:—

1. In a fishing reel structure comprising end plates, a spool rotatable therebetween, and means for preventing overrunning of the spool, comprising a wire spring anchored at one end on one end plate, a pin pierced by the spring and slidably carried in said end plate, a brake block also pierced by the spring and also slidably carried in said end plate, and means for moving the pin toward and from the spool flange.

2. In a fishing reel structure comprising end plates, a spool rotatable therebetween, and means for preventing overrunning of the spool, comprising a wire spring anchored at one end on one end plate, a pin pierced by the spring and slidably mounted on one end plate, a brake block also pierced by the spring and also slidably mounted on said end plate, and a rotatable cam against which the end of the pin bears.

3. In a fishing reel comprising end plates, a spool having a flange adjacent one end plate, a curved wire spring anchored at one end to the plate and lying between the plate and the spool flange, a guide mounted in the end plate, a brake block freely slidable in the guide, the free end of the spring crossing the guide and piercing the brake block, and adjustable means located at a midway point on the spring and operable to flex the end of the spring toward and away from the spool flange.

4. In a fishing reel comprising end plates, a spool having a flange adjacent one plate, a wire spring anchored at one end to the plate and lying between the plate and the spool flange, a guide mounted in the end plate, a brake block freely slidable in the guide, the free end of the spring passing through the brake block, slots in the guide to receive the end of the spring, and adjusting means acting upon the spring between its anchorage point and the brake block to adjust the spring toward and from the spool flange.

FRANCIS M. CASE.